United States Patent
Shimizu

(10) Patent No.: US 6,655,881 B2
(45) Date of Patent: Dec. 2, 2003

(54) THROW-AWAY TIP

(75) Inventor: Hiroyasu Shimizu, Ibi-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/059,241

(22) Filed: Jan. 31, 2002

(65) Prior Publication Data

US 2002/0146292 A1 Oct. 10, 2002

(30) Foreign Application Priority Data

Feb. 5, 2001 (JP) .................... P2001-028525
Jun. 19, 2001 (JP) .................... P2001-184829

(51) Int. Cl.$^7$ ............... B23B 27/22; B23C 5/20
(52) U.S. Cl. .................... 407/113; 407/114
(58) Field of Search ............... 407/113, 114, 407/115, 116, 119; 82/1.11

(56) References Cited

U.S. PATENT DOCUMENTS

| 4,616,963 A | * | 10/1986 | Habert et al. ............... 407/114 |
| 5,006,020 A | * | 4/1991 | Roos ............... 407/113 |
| 5,178,645 A | * | 1/1993 | Nakamura et al. ............... 407/119 |
| 5,584,045 A | * | 12/1996 | Tanabe et al. ............... 407/119 |
| 5,634,745 A | * | 6/1997 | Wiman et al. ............... 407/113 |
| 5,771,763 A | | 6/1998 | Näslund et al. |
| 5,914,181 A | | 6/1999 | Uchino et al. |
| 6,082,936 A | * | 7/2000 | Moriguchi et al. ............... 407/119 |
| 6,161,990 A | * | 12/2000 | Oles et al. ............... 407/119 |
| 6,217,263 B1 | * | 4/2001 | Wiman et al. ............... 407/114 |
| 6,244,791 B1 | * | 6/2001 | Wiman et al. ............... 407/114 |

FOREIGN PATENT DOCUMENTS

| EP | 0812650 A2 | 12/1997 |
| JP | 4-193406 | 7/1992 |
| JP | 10-500363 | 1/1998 |

* cited by examiner

*Primary Examiner*—A. L. Wellington
*Assistant Examiner*—Dana Ross
(74) *Attorney, Agent, or Firm*—Rader Fishman & Grauer

(57) ABSTRACT

A throw-away tip comprises a tip body with a rake face and a flank face; a generally plane chamfered surface formed at and along a cutting-edge-forming ridge where the rake face and the flank face cross each other; and a phantom radius surface formed at a crossing ridge between the chamfered surface and the flank face, the phantom radius surface being constituted, as in section perpendicular to the cutting-edge-forming ridge, by a plurality of lines connected to one another to provide a generally convex shape. A throw-away tip is provided which has an improved wear resistance and a tough cutting edge, prevents occurrence of fins, and enables suppression of chipping and breaking.

8 Claims, 2 Drawing Sheets

THROW-AWAY TIP

BACKGROUND OF THE INVENTION

1. Field of the Invention

The present invention relates to a throw-away tip which is detachably mounted on a tool body of a throw away cutting tool for use in various cutting operations.

2. Description of the Related Art

As a throw-away tip of this type, one is generally known in which a plate-like tip body has a major surface formed as a rake face and a peripheral surface formed as a flank face, and a cutting edge formed at the crossing ridge between the rake face and the flank face. Recently, a so-called CBN tip has been widely used in which the cutting-edge portion is formed of high hardness CBN (cubic boron nitride). Such a CBN tip, although having high hardness, lacks toughness and is fragile compared with hard metal or the like, and is susceptible to chipping and breaking. Therefore, especially with such a CBN tip, for the purposes of preventing chipping and breaking, the above cutting-edge-forming ridge is subjected to honing to form a chamfered surface. In such honing, it is a common practice to provide a plane chamfered surface which crosses the rake face and the flank face at an obtuse angle or to provide a rounded surface of an arc shape in section perpendicular to the cutting-edge-forming ridge. There is also a case where the honing is effected to provide, as shown in FIG. 4, a plane chamfered surface 1 and a rounded surface 3 at the crossing ridge between the plane chamfered surface 1 and a flank face 2.

These conventional throw-away tips, however, have the following drawbacks. First, where the honing is effected to provide only the plane chamfered surface, because its angle is still acute, the crossing ridge portion between the chamfered surface and the rake face, and between the chamfered surface and the flank face is susceptible to chipping in spite of the honing. Next, because of the hardness of CBN, a sufficiently large honing width may not be obtained with the present honing-to-round technique. Therefore, where only the honing-to-round is effected, a honing width that exceeds 0.07 mm, for example, which is usually required, may not be attained without an extensive honing cost, making it industrially impractical.

On the other hand, as shown in FIG. 4, where the honing is effected to provide the rounded surface 3 in addition to the plane chamfered surface 1, a large round-honing width is not required as compared with round-honing the entire surface to be chamfered. Also in this case, however, to improve the toughness of the cutting edge, the radius R of the honed rounded surface 3 as in the section as referred to above must be enlarged, resulting in the throw-away tip having a greatly reduced wear resistance. Especially when working on hardened steel, fins are likely to be produced. In contrast, if the above radius R is small, the effect of improving the toughness of the cutting edge becomes small, resulting in an insufficient improvement in resistance to chipping or breaking.

SUMMARY OF THE INVENTION

The present invention has been made to overcome the above drawbacks, and accordingly, it is an object of the present invention to provide a throw-away tip which has an improved wear resistance and a tough cutting edge, prevents occurrence of fins, and enables suppression of chipping and breaking.

In order to attain the above object, according to the present invention, there is provided a throw-away tip which comprises a tip body with a rake face and a flank face; a generally plane chamfered surface formed at and along a cutting-edge-forming ridge where the rake face and the flank face cross each other; and a phantom radius surface formed at a crossing ridge between the chamfered surface and the flank face, the phantom radius surface being constituted, as in section perpendicular to the cutting-edge-forming ridge, by a plurality of lines connected to one another to provide a generally convex shape.

In the thus constructed throw-away tip, because the phantom radius surface in section is formed in a bent-back but generally convex shape from the chamfered surface to the flank face, an improvement in wear resistance may be made as compared with a throw-away tip in which the region between the chamfered face and the flank face is round-honed. Furthermore, because each crossing angle of neighboring lines is on the average larger than the crossing angle of the chamfered surface and the flank face, the toughness of the cutting edge is improved, and a reduction may be made in the processing cost. Incidentally, such a phantom radius surface may be formed with ease by grinding the tip body with a brush adhered with, for example, loose grains of a material such as diamond.

It is desirable that the radius of an arc approximated to the plurality of lines connected in a generally convex shape as in the section perpendicular to the cutting-edge-forming ridge, or the phantom radius R of the phantom radius surface in section is in the range of from 0.02 to 0.07 mm. If the radius is less than the above, the crossing angle of neighboring lines becomes small, resulting in an impaired improvement in resistance to chipping, while in contrast, if it exceeds the above range, there arises a fear that the improvement in wear resistance will be impaired.

Preferably, the phantom radius surface is constituted, in the section perpendicular to the cutting-edge-forming ridge, by a plurality of straight lines, neighboring ones of which cross each other in a convex manner. In this way, the wear resistance and the cutting-edge toughness may be more effectively improved. In this instance, the number of the straight lines, as in section perpendicular to the cutting-edge-forming ridge, constituting the phantom radius surface, is preferably at least three. If the phantom radius surface in section is formed by two or less straight lines, the crossing angle of the two straight lines becomes small, possibly resulting in an impaired improvement in resistance to chipping. Furthermore, in this instance, the radius of an arc as in the section perpendicular to the cutting-edge-forming ridge, which extends through an intersection point between the phantom radius surface and the chamfered surface, an intersection point between the phantom radius surface and the flank face, and crossing points of neighboring ones of the straight lines constituting the phantom radius surface, is preferably in the range of from 0.02 to 0.07 mm.

Preferably, the surface-roughness of the rake face is ½ or less of the surface-roughness of the flank face within a region of 100 μm from the crossing ridge between the flank face and the phantom radius surface. In this way, a smooth flow of chips produced during cutting work is achieved, thereby preventing the occurrence of welding on the cutting edge and the rake face. More specifically, it is preferred that the surface-roughness of the rake face be in the range of from Rmax 0.01 to 2.0 μm, and that the surface-roughness of the flank face be in the range of from Rmax 0.1 to 5.0 μm.

The above and other objects and features of the present invention will become more apparent from the following description taken in conjunction with the accompanying drawings.

DETAILED DESCRIPTION OF THE PREFERRED EMBODIMENTS

Preferred embodiments of the present invention will now be described with reference to the attached drawings.

Figure 1:
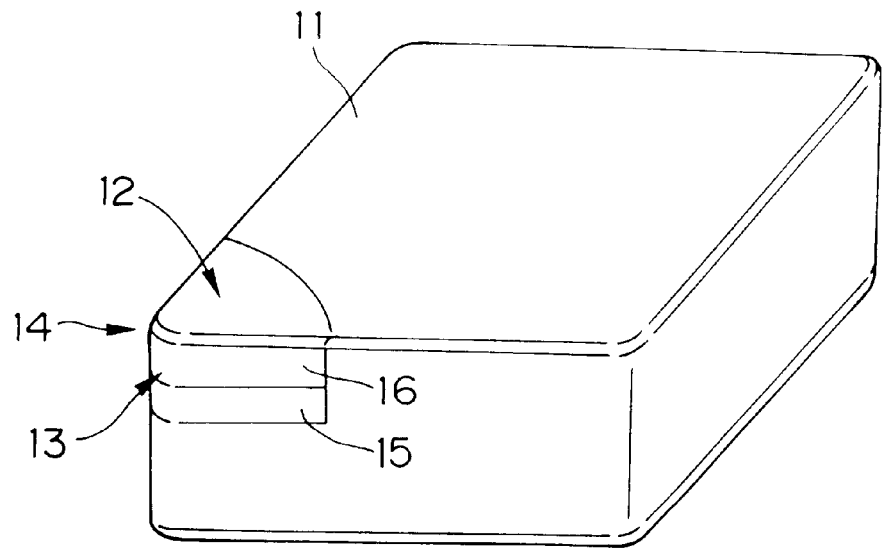
FIG. 1 is a perspective view of one embodiment of a throw-away tip according to the present invention.
Figure 2:
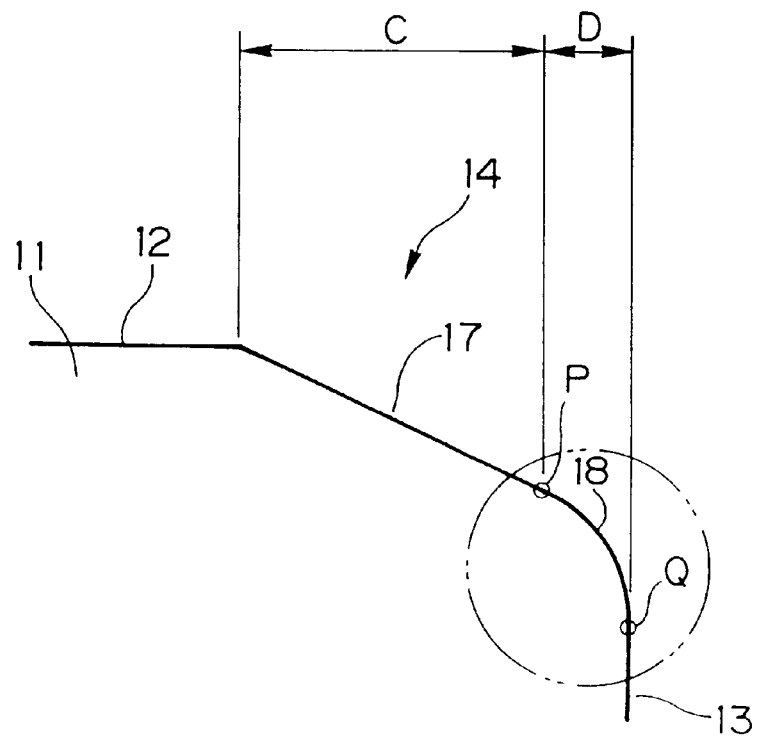
FIG. 2 is a partial sectional view taken perpendicularly to a cutting-edge-forming ridge of the embodiment in FIG. 1.
Figure 3:
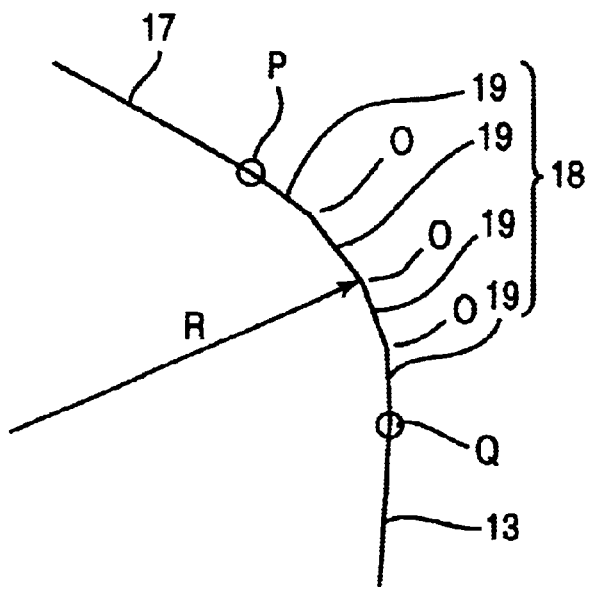
FIG. 3 is an enlarged view of the portion encircled with a chain line in FIG. 2.
Figure 4:
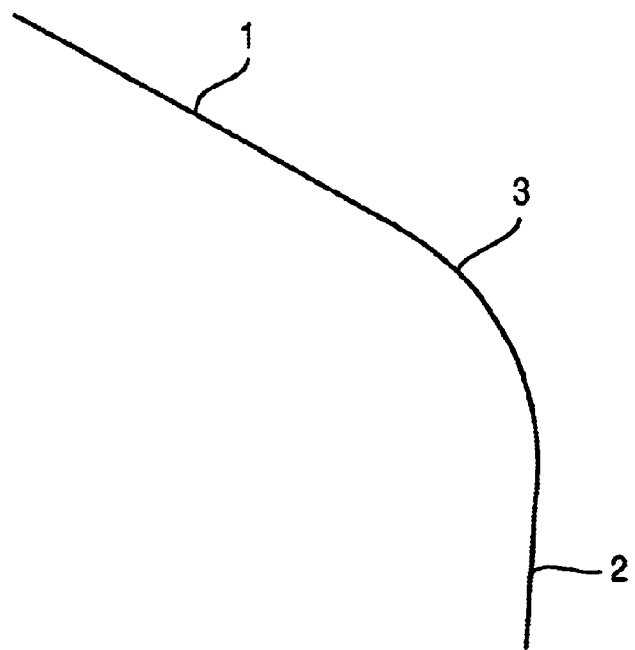
FIG. 4 is a sectional view taken perpendicularly to a cutting-edge-forming ridge of a conventional throw-away tip.

FIGS. 1 to 3 show one embodiment of the present invention. In the present embodiment, a tip body 11 is formed of hard material such as a hard metal and is provided in the form of a rectangular plate. One rectangular surface (major surface) of the plate forms a rake face 12 and a peripheral surface thereof a flank face 13, and a crossing ridge between the rake face 12 and the flank face 13 constitutes a cutting-edge-forming ridge 14. Here, at one corner of the tip body 11 is joined by brazing or the like a cutting edge tip which consists of a hard sintered body 15 such as a sintered hard alloy and a CBN sintered body 16 that are integrally sintered in layers, with the CBN sintered body 16 located on the side of the rake face 12. The above cutting-edge-forming ridge 14 is formed on the CBN sintered body 16.

On the cutting-edge-forming ridge 14, as shown in the section perpendicular thereto in FIG. 2, a plane chamfered surface 17 is formed in a crossing direction with the rake face 12 and the flank face 13 at an obtuse angle. Furthermore, as shown enlarged in FIG. 3, a phantom radius surface 18 is formed at the crossing ridge between the chamfered surface 17 and the flank face 13, which radius surface 18 is constituted, as in the section perpendicular to the cutting-edge-forming ridge 14, by a plurality of lines connected to one another to provide a generally convex shape. Especially in the present embodiment, the phantom radius surface 18 consists of plural (four) straight lines continuous to one another in a generally convex, bent-back manner. In other words, the phantom radius surface 18 is constituted by the same number of plane faces 19 as that of the above straight lines, which extend along the cutting-edge-forming ridge 14 between the chamfered surface 17 and the flank face 13, and which cross one another at an obtuse angle to extend in a convex, continuous manner from the chamfered surface 17 to the flank face 13. In the present embodiment, the widths of the plane faces 19 in the direction along the above straight lines are equal to one another, and neighboring plane faces 19 . . . cross each other at equal angles. Thus, the three bent-back points O where neighboring straight lines cross each other and the intersection points P and Q where the phantom radius surface 18 crosses the chamfered surface 17 and the flank face 13, respectively, lie in one arc as in the above-referenced section. In the present embodiment, the radius of this arc, that is, the phantom radius R of the phantom radius surface 18 in section is in the range from 0.02 to 0.07 mm.

On the other hand, in the present embodiment, the surface-roughness of the rake face 12 is in the range of Rmax 0.01 to 2.0 μm in the maximum height defined in JIS B 0601, and the surface-roughness of the flank face 13 is in the range of Rmax 0.1 to 5.0 μm at least within the region of 100 μm from the intersection point Q as in the above-referenced section, that is, from the crossing ridge between the flank face 13 and the phantom radius surface 18. Furthermore, in the present embodiment, the surface-roughness of the rake face 12 is set to be ½ or less of the surface-roughness of the flank face 13 within that region of 100 μm from the crossing ridge between the flank face 13 and the phantom radius surface 18.

With the thus constructed throw-away tip, because the phantom radius surface 18 is formed at the crossing ridge between the chamfered surface 17 and the flank face 13, as compared with the throw-away tip in which the chamfered surface 17 directly crosses the flank face, the tip strength at that crossing ridge may be improved, leading to toughness of the cutting-edge-forming ridge 14 and to the fact that, if the cutting-edge-forming ridge 14 is formed by the CBN sintered body 16, the occurrence of chipping, breaking and the like may be prevented. Next, as compared with the throw-away tip in which the round-honing is effected on the entire cutting-edge-forming ridge 14 where the rake face 12 and the flank face 13 cross each other, because the phantom radius surface 18 is constituted in section by a plurality of lines connected to one another to provide a generally convex shape, especially in the present embodiment because the chamfered surface 17 as well as the plane faces 19 that constitute the phantom radius surface 18 are all planar, its formation does not require such a high processing technique, leading to a reduction in the processing cost. Furthermore, as compared with the throw-away tip in which the round-honing is effected only on the crossing ridge between the chamfered surface 17 and the flank face 13, because the phantom radius surface 18 is constituted by the plane faces 19 . . . , each plane face 19 between neighboring intersection points O, P, and Q is located retracted from the circle of the phantom radius R, thereby lessening the contact with a workpiece and improving the wear resistance. If hardened steel or the like is cut, the occurrence of fins may be suppressed, leading to smooth working.

In the present embodiment, as mentioned above, the phantom radius surface 18 is constituted by four plane faces 19 . . . , or as in the above-referenced section, the number of the straight lines that forms the phantom radius surface 18 is four. If this, for example, is two, that is, if the phantom radius surface 18 is constituted by two straight lines bent back only at one point O between the intersection points P and Q, the crossing angle of these two plane faces 19 at the point O becomes large, making it impossible to reliably prevent chipping and the like. For this reason, although dependent on the size of the tip body 11, the size of the entire honing width from the rake face 12 to the flank face 13 and the like, the number of such straight lines as in the above-referenced section is preferred to be three or more. On the contrary, if there are provided so many straight lines as to make it impossible to distinguish from the case where the round-honing is effected, the effect as mentioned above may not be sufficiently attained. Thus, although dependent on the size of the tip body 11 and the size of honing width, the number of the straight lines is preferred to be from 3 to 10.

In the present embodiment, as mentioned above, the phantom radius R in section of the arc derived from the generally bent-back straight lines constituting the phantom radius surface 18, is in the range of from 0.2 to 0.07 mm. If the phantom radius R is less than the above, the phantom radius surface 18 itself, although dependent on the tip body 11 and the honing width, becomes acute, possibly causing chipping and the like. On the contrary, if the phantom radius R exceeds the above range, the phantom radius surface 18 comes close to a plane surface, making the crossing ridge between the chamfered surface 17 and the flank face 13 susceptible to chipping and the like. Therefore, it is preferred that the phantom radius R be in the range of from 0.02 to 0.07 mm as in the present embodiment.

Incidentally, in the present embodiment, the intersection points O, P, and Q lie in one arc. It is to be noted, however, that if crossing angles of neighboring plane faces 19 and their widths (lengths of the above straight lines) are not equal, and thus the intersection points O, P and Q do not lie in one arc, it is sufficient if the radius of an arc approximated to these intersection points falls within the above range. Furthermore, the plural, generally bent-back lines as in the above-referenced section, constituting the phantom radius surface 18 may in all or in part be curved, and may include a locally concave portion if provided as a whole in a convex form.

In the present embodiment, as mentioned above, the surface-roughness of the rake face 12 is set to be ½ or less of the surface-roughness of that portion of the flank face 13 on the side of the phantom radius surface 18. Due to this, a smooth flow of chips may be achieved that is produced by the cutting-edge-forming ridge 14 during cutting work, and which would otherwise possibly scratch the flank face 12, thereby preventing welding from taking place on the cutting-edge-forming ridge 14 and the flank face 12, and reducing the cutting force. Furthermore, in the present embodiment, the surface-roughness of the rake face 12 is set in the range of from Rmax 0.01 to 2.0 µm, and the surface-roughness of the flank face 13 is set in the range from Rmax 0.1 to 5.0 µm, thereby enabling achievement of the above effects more reliably, and thereby making it unnecessary to so carefully control the surface-roughness of the flank face 13 and simplifying the manufacturing process for throw-away tips.

Cutting tests were conducted using throw-away tips according to the embodiments of the present invention and the conventional throw-away tips as referred to above, and the results are shown in Table 1. The chamfer width C and the round width D in this Table are as defined in FIG. 2, and the entire honing width (C+D) was commonly 0.1 mm. As for the throw-away tips according to the present invention, the phantom radius surface 18 was made on the round width D as shown in FIG. 2. The cutting conditions in these cutting tests were as shown below.

| Cutting speed: | Vc = 150 m/min |
| --- | --- |
| Feed per one rotation: | f = 0.1 mm/rev |
| Depth of cut: | ap = 0.05 mm |
| Workpiece material: | SCM440 (HRC60) |
| | Dry cutting |

TABLE 1

| Honing shape | | Honing width (mm) chamfer width C | Round width D | Number of straight lines | Cutting time | Cause of end of service life |
| --- | --- | --- | --- | --- | --- | --- |
| Conventional examples | Chamfer | 0.1 | — | — | 1 | Breakage |
| | Round | — | 0.1 | — | 8 | Fins |
| | Chamfer + round | 0.07 | 0.03 | — | 7 | Breakage |
| | | 0.05 | 0.05 | — | 9 | Fins |
| Embodiment 1 | | 0.07 | 0.03 | 2 | 10 | VB = 0.1 mm |
| | | | | 3 | 25 | VB = 0.1 mm |
| | | | | 5 | 30 | VB = 0.1 mm |
| | | | | 10 | 28 | VB = 0.1 mm |
| Embodiment 2 | | 0.05 | 0.05 | 2 | 12 | VB = 0.1 mm |
| | | | | 3 | 21 | VB = 0.1 mm |
| | | | | 5 | 25 | VB = 0.1 mm |
| | | | | 10 | 23 | VB = 0.1 mm |
| Embodiment 3 | | — | 0.1 | 2 | 9 | VB = 0.1 mm |
| | | | | 3 | 11 | VB = 0.1 mm |
| | | | | 5 | 16 | VB = 0.1 mm |
| | | | | 10 | 8 | Fins |

As is apparent from the results shown in Table 1, where the honing is effected to provide only a plane chamfered surface, or a plane chamfered surface plus a rounded surface having a small round width D, such throw-away tips had their cutting-edge-forming ridges broken and a short service life. Furthermore, where only the round honing is effected, or the honing is effected to provide a plane chamfered surface plus a round surface having a large width D, such throw-away tips were inferior in wear resistance and suffered from fins. In contrast, with throw-away tips according to the present embodiment, there was observed as a whole no breaking or fins, and the flank wears VB were as a whole maintained approximately at 0.1 mm. Incidentally, the throw-away tip at the lowermost in Table 1 with a phantom radius surface formed on the entire 0.1 mm honing width, may be considered an embodiment of the present invention if that plane face closest to the rake face is taken as a chamfered surface. Such a throw-away tip, provided with a large number of the above straight lines, came close to the form of a throw-away tip in which only the round-honing was effected, and gave rise to fins. It is thus preferred that the number of the straight lines constituting the phantom radius surface be 3 to 10.

As described hereinbefore, according to the present invention, chipping and breaking may be prevented while reducing the processing cost, and an improvement in wear resistance may be made, with the result that the tip life is prolonged, and a high finishing accuracy is attained.

What is claimed is:
1. A throw-away tip comprising:
 a tip body with a rake face and a flank face;
 a generally plane chamfered surface formed at and along a cutting-edge-forming ridge where said rake face and said flank face cross each other; and a phantom radius surface formed at a crossing ridge between said chamfered surface and said flank face, said phantom radius surface being constituted, in cross section perpendicular to said cutting-edge-forming ridge, by a plurality of straight lines connected to one another to provide a generally convex shape, wherein a radius of an arc approximated to said plurality of lines connected in a generally convex shape.

2. A throw-away tip according to claim 1, wherein a radius of an arc approximated to said plurality of lines connected in a generally convex shape as in the section perpendicular to the cutting-edge-forming ridge, is in the range of from 0.02 to 0.07 mm.

3. A throw-away tip according to claim 1, wherein surface-roughness of said rake face is ½ or less of a surface-roughness of said flank face within a region of 100 µm from a crossing ridge between said flank face and said phantom radius surface.

4. A throw-away tip according to claim 1, wherein surface-roughness of said rake face is in a range of from Rmax 0.01 to 2.0 µm, and surface-roughness of said flank face is in a range of from Rmax 0.1 to 5.0 µm.

5. A throw-away tip according to claim 4, wherein surface-roughness of said rake face is ½ or less of a surface-roughness of said flank face within a region of 100 µm from a crossing ridge between said flank face and said phantom radius surface.

6. A throw-away tip comprising:

a tip body with a rake face and a flank face;

a generally plane chamfered surface formed at and along a cutting-edge-forming ridge where said rake face and said flank face cross each other; and a phantom radius surface formed at a crossing ridge between said chamfered surface and said flank face, said phantom radius surface being constituted, in cross section perpendicular to said cutting-edge-forming ridge, by a plurality of lines connected to one another to provide a generally convex shape, wherein a radius of an arc approximated to said plurality of lines connected in a generally convex shape as in the section perpendicular to the cutting-edge-forming ridge, is in the range of from 0.02 to 0.07 mm and said phantom radius surface is constituted, in the section perpendicular to the cutting-edge-forming ridge, by a plurality of straight lines, neighboring ones of which cross each other in a convex manner.

7. A throw-away tip according to claim 6, wherein the number of said straight lines, as in cross section perpendicular to the cutting-edge-forming ridge, constituting said phantom radius surface is at least three.

8. A throw-away tip according to claim 6 or 7, wherein a radius of an arc as in the section perpendicular to the cutting-edge-forming ridge, which extends through an intersection point between said phantom radius surface and said chamfered surface, an intersection point between said phantom radius surface and said flank face, and crossing points of neighboring ones of said straight lines constituting said phantom radius surface, is in a range of from 0.02 to 0.07 mm.

* * * * *